March 21, 1961

J. COLEMAN 2,975,661

DRILLING MACHINES

Filed Feb. 18, 1960

4 Sheets-Sheet 1

INVENTOR
JAMES COLEMAN
BY Howson & Howson
ATTYS.

March 21, 1961 J. COLEMAN 2,975,661
DRILLING MACHINES
Filed Feb. 18, 1960 4 Sheets-Sheet 2

INVENTOR
JAMES COLEMAN
BY Howson & Howson
ATTYS.

March 21, 1961

J. COLEMAN

DRILLING MACHINES 2,975,661

Filed Feb. 18, 1960

4 Sheets-Sheet 3

INVENTOR:
JAMES COLEMAN

BY Howson & Howson

ATTYS.

March 21, 1961 J. COLEMAN 2,975,661
DRILLING MACHINES
Filed Feb. 18, 1960
4 Sheets-Sheet 4

INVENTOR:
JAMES COLEMAN
BY Howson & Howson
ATTYS.

2,975,661
Patented Mar. 21, 1961

2,975,661

DRILLING MACHINES

James Coleman, Mendham, Morris County, N.J., assignor to Coleman Machine Company, Inc., Berkeley Heights, N.J., a corporation of New Jersey Filed Feb. 18, 1960, Ser. No. 9,639
2 Claims. (Cl. 77—32.2)

The present invention relates to drilling machines, and more particularly to apparatus for drilling printed circuit boards with high precision and relatively low cost.

The conventional printed-circuit board comprises a sheet of non-conductive material having imbedded or embossed thereon a pattern of lines or circuits of conductive material. In order to connect the printed circuit boards with other components, holes are required at predetermined locations in the boards. The formation of the holes requires such precision and accuracy both as to location and size, that it is necessary to drill the holes in the boards individually. The drilled boards must be free from burrs or damage from the hole-forming operation.

Prior to the present invention, printed-circuit boards of this type were drilled individually by manual location of the boards under a drill press and visual indexing of the drill with the locations on the board to be drilled. Depending on the skill of the operator, such procedures are time-consuming and highly susceptible to human error, leading to a high number of rejected pieces.

With the foregoing in mind, the present invention provides an apparatus in which a template is employed to accurately locate the printed-circuit boards relative to the drill prior to the drilling operation so that the drill automatically drills the boards properly.

More specifically, the present invention provides apparatus including a drill assembly, a guiding template mounted in a fixed position, and a carriage having means cooperable with the template to position the carriage, the carriage supporting the board in the path of movement of the drill, the drill assembly including means firmly engaging the board between bushings through which the drill passes to prevent the formation of burrs and the like.

The invention may also embody the use of air to both advance the drill into the work and clamp the work between the bushings, the air pressure when not operating for these purposes, being used to maintain the work free of particles which might otherwise interfere with the proper operation of the drill.

All of the objects of the present invention are more fully set forth hereinafter with reference to the accompanying drawings wherein.

Figures 1, 2, 3:
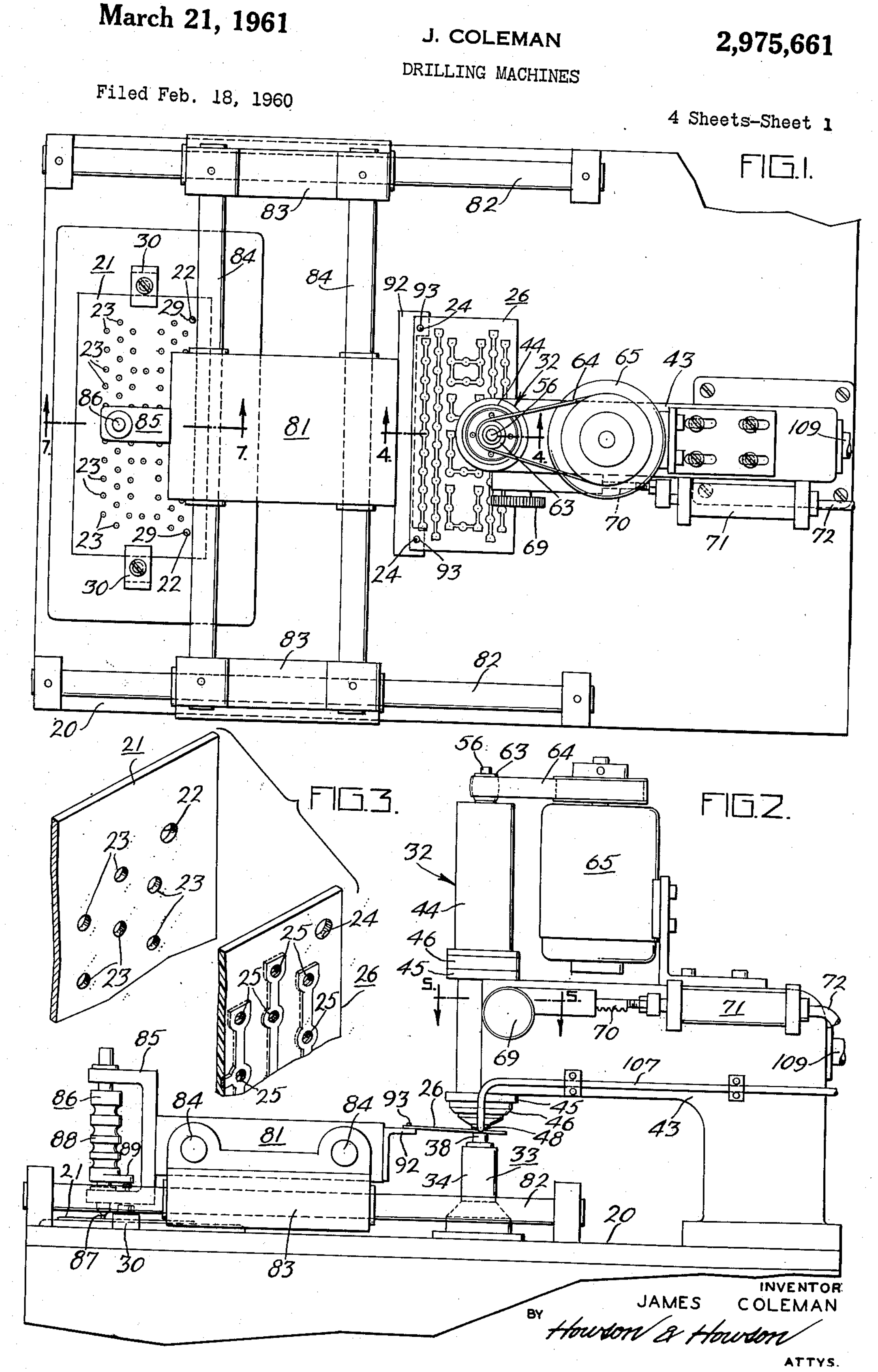
Fig. 1 is a plan view of apparatus made in accordance with the present invention.
Fig. 2 is a view in side elevation of the apparatus shown in Fig. 1.
Fig. 3 shows the relationship of the template to the board.

Referring now to the drawings, the apparatus illustrated therein comprises a work table 20 preferably located at a convenient height for the operator. At the front of the work table, means is provided to mount a template 21 which has a pair of positioning holes 22, 22 and a plurality of guide holes 23 corresponding respectively to the positioning holes 24 and component-connection holes 25 of the printed-circuit board 26 being fabricated by the machine. The template 21 is mounted on the table 20 by means of a pair of positioning pins 29, 29 operable to engage in the positioning holes 22, 22 of the template, and hold-down lugs 30, 30 which engage over the side edges of the template.

A drill assembly 32 is accurately positioned on the work table 20 relative to the template mounting means. The assembly 32 includes an under-support 33 having a hollow pedestal 34 forming an air cylinder 35. A piston 36 is slidable in the cylinder 35 and is biased downwardly by means of a spring 37. The piston 36 at its upper end carries a bottom bushing 38 which has a central bore 39 through into which the drill may pass during the drilling operation. The bushing 38 is displaced upwardly into engagement with the work by air pressure admitted to the cylinder 35 through an inlet nipple and supply conduit 40.

The drilling assembly also includes means mounting a drill 42 in precise registry with the bore 39 of the bottom bushing 38. To this end, a hollow box frame 43 is secured to the work table 20 adjacent its rearward end and projects upwardly and forwardly into overlying relationship with the pedestal 33. At its front end, the hollow frame 43 mounts a spindle shell 44 by means of a pair of collars 45, 45 and adjusting nuts 46, 46, the function of which is more fully set forth hereinafter.

Figure 4:
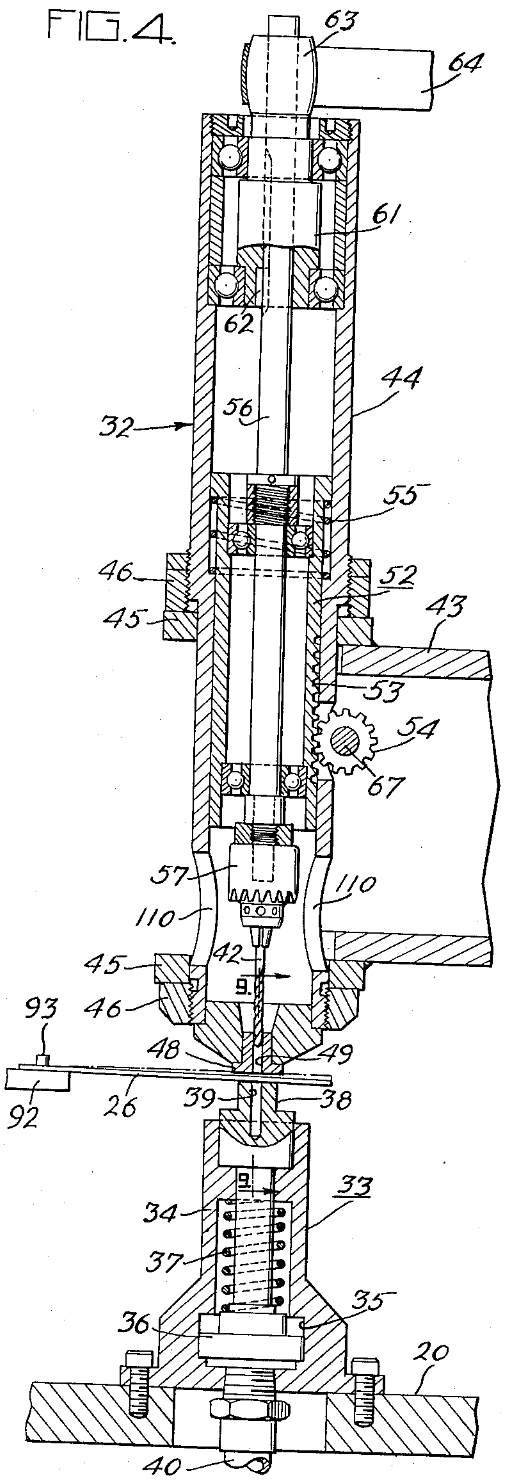
Fig. 4 is an enlarged vertical sectional view through the drill and support assembly taken on the line 4—4 of Fig. 1.

At its lower end, the spindle shell mounts a top bushing 48 having a central bore 49 in precise registry with the bore 39 of the bottom bushing 38. A spindle-mounting sleeve 52 is slidable centrally in the spindle shell 44. The sleeve 52 is formed on one side with a series of teeth 53 which cooperate with a pinion 54 mounted in the frame 43. The sleeve 52 is biased upwardly by a spring 55 and rotatably mounts therein a drill spindle 56 having a conventional chuck 57 mounting the drill 42 thereon. Thus, rotation of the pinion 54 in a counterclockwise direction as shown in Fig. 4 advances the drill 42 through the top bushing 48 into engagement with and through the work piece 26 and into the bore 39 of the bottom bushing 38. Clockwise rotation of the pinion 54 retracts the drill and the retractive movement is assisted by the spring 55.

The drill spindle 56 is rotated by a drive bushing 61 rotatably mounted at the upper end of the spindle shell 44 and keyed to the spindle as indicated at 62. The drive bushing 61 is provided with a pulley 63 projecting above the spindle shell 44 in a position to engage a drive belt 64 driven by a suitable drive motor 65 mounted on the hollow frame 43 (see Figs. 1 and 2). The keyed connection between the drive bushing 61 and the shaft 56 insures positive driving of the spindle regardless of its relative positon axially is the spindle shell.

Figures 5, 6:
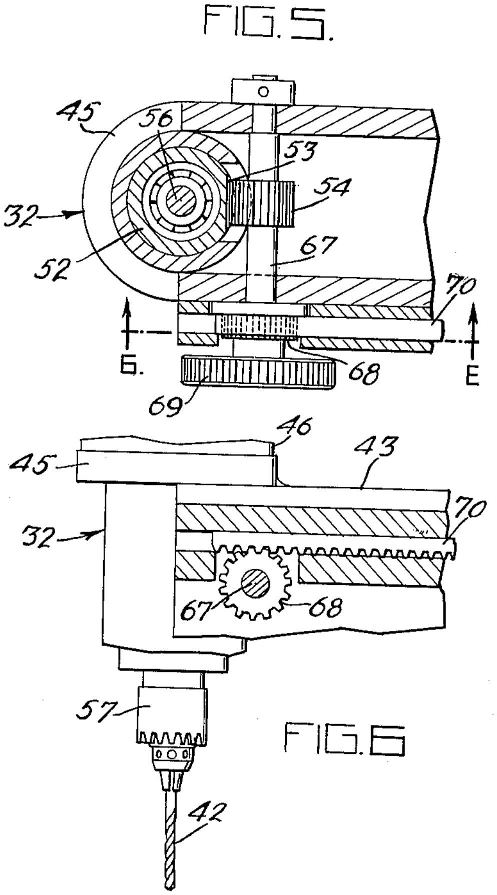
Fig. 5 is an enlarged horizontal sectional view taken on the line 5—5 of Fig. 2.
Fig. 6 is a sectional view taken on the line 6—6 of Fig. 5.

The frame 43 also mounts the drive means for the pinion 54. As shown in Fig. 5, the pinion 54 is mounted on an axle 67 having secured thereto a second pinion 68 exteriorly of the frame 43 and a manual adjusting knob 69. A rack 70 is slidably mounted in the frame 43 in engagement with the pinion 68 and is operable to be displaced longitudinally by an air cylinder 71 connected to a source of air by a conduit 72, as more fully described hereinafter.

In accordance with the invention, means is provided to position a printed-circuit board intermediate the top and bottom bushings 48 and 38 respectively for drilling the same in accordance with the pattern set forth on the template 21. To this end, a carriage 81 is mounted for sideways and fore-and-aft movement on the table 20. To this end, a pair of parallel guides 82, 82 are mounted at the opposite sides of the table 20. Each guide 82 slidably mounts a slide 83, preferably by anti-friction slide bearings, for movement fore and aft of the table. A pair of rails 84, 84 span between the slides 83 and slidably support thereon the carriage 81, preferably by anti-friction slide bearings. Thus, the carriage 81 is freely displaceable both transversely and fore and aft relative to the table 20.

At its forward edge, the carriage 81 mounts a yoke 85 having a probe 86 journalled therein for vertical displacement. The probe, at its lower extremity has a point 87 adapted to engage in the holes 23 of the template. The intermediate portion 88 of the probe 86 is formed as a handle for operation by the operator, and at the lower extremity of the handle is a rearwardly extending foot 89 which is adapted to operate a micro-switch 90 mounted in the yoke 85 when the point 87 enters an aperture 23 in the template. The setting of the switch 90 is such that it is not actuated until the point enters the aperture. Thus, the switch is operated only when the carriage is accurately positioned in proper registry with an aperture in the template.

The carriage 81 also mounts at its rear edge a mounting bracket 92 having a pair of mounting pins 93, 93 adapted to engage in the positioning apertures 24 of the printed-circuit board. The mounting pins 93 of the bracket 92 support the board in a generally horizontal position intermediate the top and bottom bushings 48 and 38 of the drill assembly. By reason of the accurate positioning of the drill assembly relative to the template, and the corresponding positioning of the mounting pins 93 relative to the probe 86, the position on the board 26 which overlies the bushing aperture 39 corresponds precisely to the position on the template in which the probe is located. It is noted that since the template is fixed and the board moves with the carriage, the board is drilled as the mirror image of the holes of the template. In other words, as shown in Fig. 1, the positioning apertures 22 of the template are disposed along the rearward edge of the template whereas the positioning apertures of the printed circuit board are disposed along the forward edge of the board.

In the operation of the device, the template and the board are positioned on the respective pins 29 and 93, and the probe 86 is moved to register with the first hole to be drilled. When the probe is in registry with the selected hole, it will drop into the hole and operate the switch 90. Operation of the switch 90 admits air to the conduits 40 and 72 in the drill assembly 32. The pressure in the conduit 40 causes the bottom bushing to be elevated against the bias of the spring 37 to press the board up against the under surface of the top bushing 48, so that the board is firmly clamped between the top and bottom bushings 48 and 38 respectively. It is desirable that the board 26 be precisely horizontal when the drilling is performed so that the axis of the drilled hole is perpendicular to the board. Therefore, the spindle shell 44 is adjusted by means of the adjusting nuts 46 so that the under-surface of the top bushing 48 is precisely at the level of the top surface of the board when the board is horizontally disposed. Thus, when the bushing 38 is elevated under the board, it displaces the board into precise horizontal position and insures that the axis of the holes drilled in the board will be perpendicular to its upper surface. At the same time, the pressure in the conduit 72 operates the cylinder 71 to rotate the pinion 54 counter-clockwise, driving the drill 42 downwardly through the bores 49 and 39 of the bushings 48 and 38. By reason of the snug fit of the drill in the bores of the bushings, there is substantially no opportunity for burrs to form about the drilled aperture in the circuit board. When the drill bottoms, the operator releases the probe point 87 from the aperture and moves it towards the next aperture, thereby opening the switch 90 and cutting off the air pressure to the conduits 40 and 70. The spring bias on the sleeve 52 and the piston 36 return the drill to its upper limit position and the bottom bushing to its retracted position, thereby permitting the circuit board to move feely between the top and bottom bushings. The engagement of the probe into the apertures of the template during the period when the switch 90 is closed, not only insures proper registry at the initiation of the drilling operation, but also positively anchors the carriage against inadvertent displacement during the drilling operation, thereby insuring against damage to the circuit board being fabricated.

Figure 11:
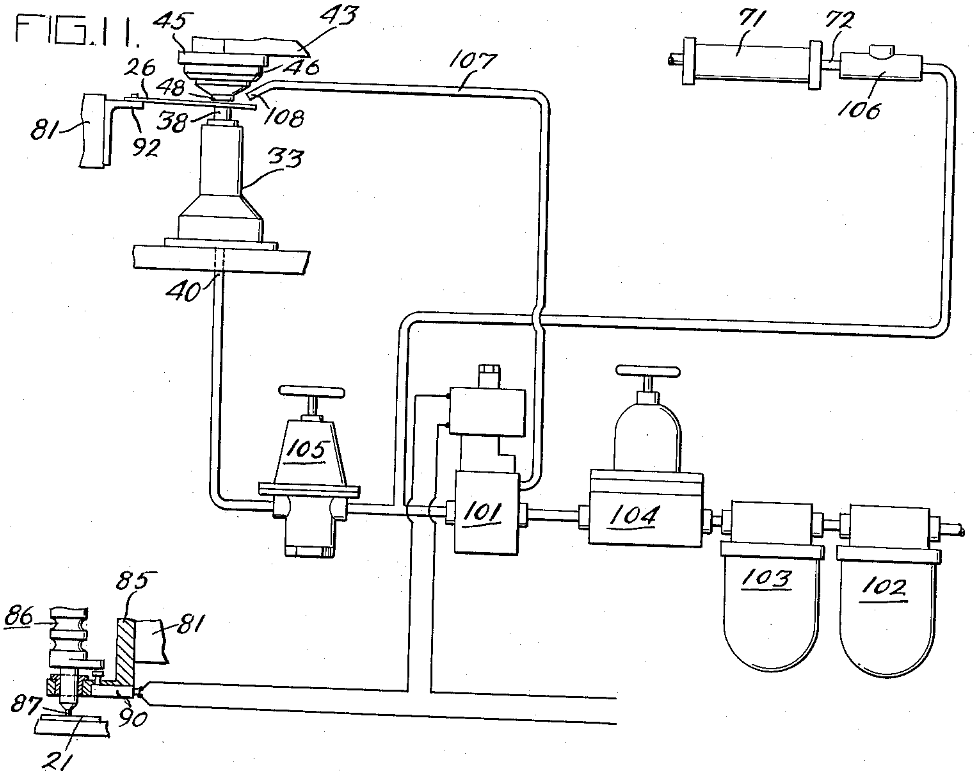
Fig. 11 is a schematic diagram of the electrical and pneumatic circuitry of the apparatus illustrated in Figs. 1 to 10.

As shown in Fig. 11, the control of the air pressure may be accomplished by a solenoid valve 101 positioned in the supply line for compressed air which may have a conventional filter 102, oiler 103, and regulator 104. When the solenoid valve 101 is energized, air pressure is admitted to the conduit 40 through a regulator 105 and to the conduit 72 through a meter valve 106. When the switch 90 is released, the valve 101 is de-energized and air pressure is channeled through a conduit 107 which terminates in a nozzle 108 mounted on the spindle shell 44 immediately adjacent the top bushing 48. The air from the nozzle 108 blows any chips or particles that might remain on the board to provide a clear and clean surface for the operation of the drill. The flow through the nozzle 108 is maintained until the switch 90 is again actuated.

To further eliminate dust and foreign particles from the work area, means is provided to apply suction to the hollow frame 43. To this end, a suction conduit 109 is connected to the interior of the hollow frame 43 to draw air through openings 110 in the spindle shell. The flow of air through the openings 110 carries particles from the drill 42 and discharges them from the work area, thereby maintaining the work area relatively clean and free of foreign particles.

Figures 7, 8:
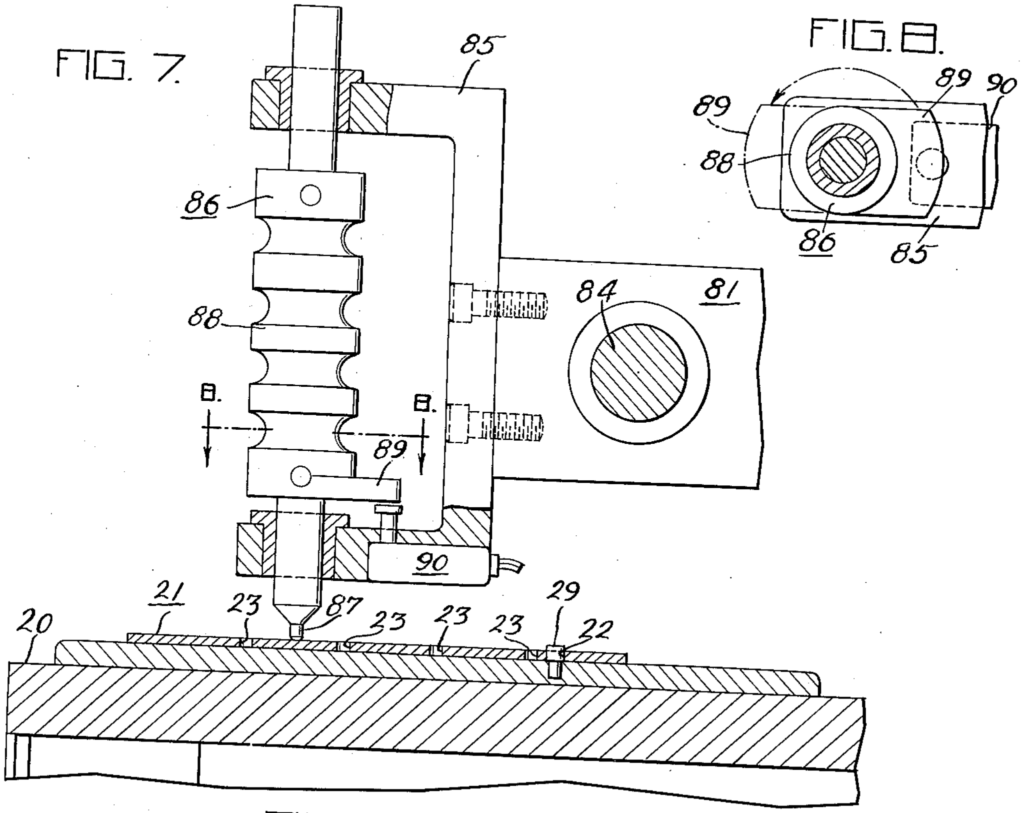
Fig. 7 is an enlarged sectional view taken on the line 7—7 of Fig. 1.
Fig. 8 is a sectional view taken on the line 8—8 of Fig. 7.
Figure 9:
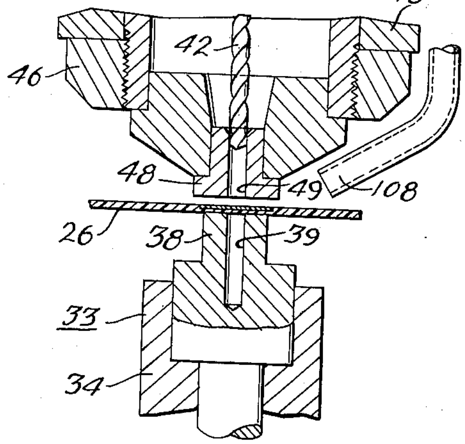
Figs. 9 and 10 are sectional views taken on the line line 9—9 of Fig. 4 respectively at the beginning and the completion of a drilling operation.
Figure 10:
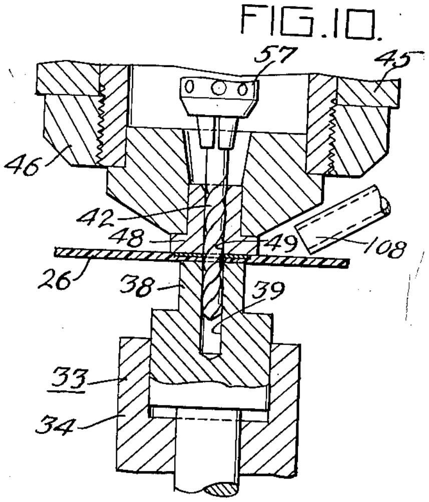

The apparatus of the present invention may also be used to form the template from a previously drilled master circuit board. In this case, the master board is inserted in place of the template, and the template sheet is mounted on the pins 93 and the machine is operated to produce a mirror image of the master circuit board. If the quantity of circuit board to be drilled does not warrant the production of a separate template, the master circuit board may be used as a template and may be inserted into the template-receiving means upside-down to produce the mirror image necessary for proper reproduction. When it is desired to produce a template from a blue-print master or other material which does not have sufficient thickness to render the switch means 90 sensitive, the foot 89 may be displaced 180 degrees on the probe so as not to rigister with the switch 90 (as shown in broken lines in Fig. 8). The point of the probe may then be registered with the desired points on the blue-print or other master copy and at each point of registry, the switch 90 may be operated manually to drill a hole in the template. When the drilling is complete, the foot 89 is returned to its original position and the template is mounted in its proper place for fabrication of the circuit boards as described above.

Figure 12:
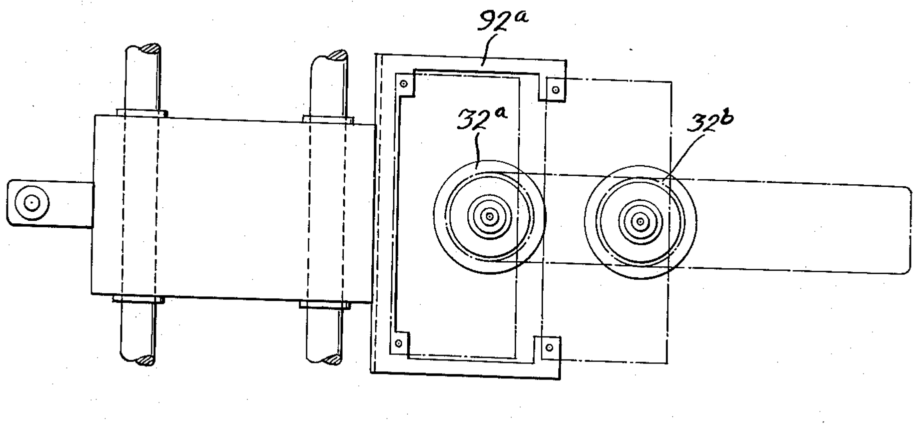
Fig. 12 is a fragmentary plan view showing a modification for drilling two boards simultaneously.

When higher production is desired, the mounting bracket 92 may be modified to support two circuit boards, and two separate drilling assemblies may be utilized, each operating on a separate board, thereby doubling the production of the unit. This is shown in Fig. 12 wherein the drilling assemblies are designated 32_a_ and 32_b_ and the modified mounting bracket is designated 92_a_. Other modifications may be made within the scope of the invention as defined in the appended claims.

I claim:

1. A drilling machine for printed-circuit boards and the like comprising a work table, a board-mounting carriage mounted above said table for moving the board in a plane, means to index said carriage, a drill assembly including a rotary drill mounted above said plane for movement perpendicular to and through said plane, said indexing means comprising a template mounted on said table having a plurality of recesses therein corresponding to the holes to be drilled in the board, and a probe on said carriage operable to engage in said recesses and positively locate said board relative to said drill during said drilling movement, a top bushing fixedly mounted with its lower surface coplanar with said plane of movement and having a central bore receiving said drill, a bottom bushing mounted below said plane in vertical registry with said top bushing, means to displace said bottom bushing upwardly into clamping cooperation with said top bushing to clamp the board therebetween whereby said board is held rigidly in said plane during the drilling operation, a switch mounted adjacent said probe, and a switch operator on said probe operable upon entry of said probe into said recesses to operate said switch to initiate upward displacement of said bottom bushing and down displacement of said drill.

2. A drilling machine for printed circuit boards comprising a work table, means on said table for mounting a template having a plurality of recesses therein, a carraige overlying said table and having a board-supporting bracket thereon, means mounting said carriage and therefore said board for movement transversely and longitudinally of said table in a plane parallel thereto, a probe mounted on said carriage for vertical movement into and out of said template recesses, a switch operator on said probe, a switch operated by said operator when said probe is entered into said template recesses, an under-support on said table projecting upwardly to underlie the plane of movement of said board, said under-support terminating at its upper end in a bottom bushing having a central bore registering with a position on said board corresponding to the position of said probe on the template, a drill disposed above said plane in axial alignment with the bore of said bottom bushing, a top bushing having a central bore receiving said drill and mounted in registry with the bore of the bottom bushing with the under-surface of said top bushing coplanar with said plane of the board, and means operated by said switch to elevate said bottom bushing and clamp the board between said top and bottom bushings, and to displace said drill downwardly through said bushings to drill the board.

References Cited in the file of this patent

UNITED STATES PATENTS 1,507,394 Meinersmann ---------- Sept. 2, 1924

FOREIGN PATENTS 281,777 Great Britain ----------- Dec. 12, 1927